United States Patent [19]

Stark

[11] Patent Number: 4,824,947
[45] Date of Patent: Apr. 25, 1989

[54] SUBSTITUTED PHTHALOCYANINE

[75] Inventor: William M. Stark, Glasgow, Scotland

[73] Assignee: Imperial Chemical Industries PLC, London, England

[21] Appl. No.: 162,514

[22] Filed: Mar. 1, 1988

[30] Foreign Application Priority Data

Mar. 10, 1987 [GB] United Kingdom ............... 8705576

[51] Int. Cl.$^4$ .................. C07D 487/22; C09B 47; C09B 04; C09B 47/30
[52] U.S. Cl. ................................ 540/125; 540/123
[58] Field of Search .......................... 540/123, 125

[56] References Cited

U.S. PATENT DOCUMENTS 4,606,859  8/1986  Duggan ................ 540/125 X

FOREIGN PATENT DOCUMENTS 2455675  5/1975  Fed. Rep. of Germany .

Primary Examiner—Richard L. Raymond
Attorney, Agent, or Firm—Cushman, Darby & Cushman

[57] ABSTRACT

A phthalocyanine compound of the formula:

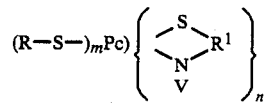

I wherein
Pc is a phthalocyanine nucleus;
each R independently is optionally substituted phenyl;
m is 4 to 12;
V is H or $C_{1-4}$-alkyl;
each $R^1$ independently is optionally substituted phenylene or naphthylene in which the S atom and group N-V are attached to adjacent nuclear carbon atoms; and n is 2 to 6;
provided that R is not $R^1$-NHV.

The compounds have a significant absorption band in the near infra red and are soluble in non-polar organic media. The compounds are useful in many applications where absorption of infra-red radiation is desirable, such as in OCR readable inks, security printing and reprographic toners.

6 Claims, No Drawings

SUBSTITUTED PHTHALOCYANINE

This specification describes an invention relating to certain poly(substituted)phthalocyanine compounds which absorb in the near infra-red region of the electromagnetic spectrum, e.g. at 700–1500 nanometers (nm) and especially at 750–1100 nm.

According to the present invention there is provided a phthalocyanine compound of the formula:

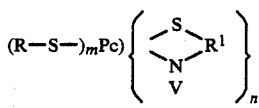

wherein
Pc is a phthalocyanine nucleus;
each R independently is a monovalent aromatic radical linked to a peripheral carbon atom of the Pc nucleus through S;
m is 4 to 12;
V is H or $C_{1-4}$-alkyl;
each $R^1$ independently is optionally substituted phenylene or naphthylene in which the S atom and group N-V are attached to adjacent nuclear carbon atoms in $R^1$;
and n is 2 to 6;
provided that R is not $R^1$-NHV.

The core of the phthalocyanine nucleus (Pc) may be metal-free or contain any of the metals or oxymetals which are capable of being complexed within the core. Examples of suitable metals and oxymetals are magnesium, palladium, gallanyl, vanadyl, germanium, indium and more especially copper, particularly copper(II), nickel, cobalt, iron, zinc, lead and cadmium. Where appropriate in this specification, a metal free phthalocyanine is designated, $H_2Pc$ and a metallised phthalocyanine such as copper(II) phthalocyanine is designated, Cu(II)Pc.

The S atom and the group N-V, are preferably attached to adjacent carbon atoms of the phthalocyanine nucleus, especially in the 4,5-positions, to form a 6 membered heterocycle fusing $R^1$ to the phthalocyanine nucleus, viz,

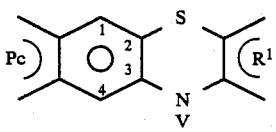

It is preferred that R is unsubstituted or substituted by from 1 to 3, more especially 1 or 2 groups, preferably situated in the ortho and or para positions with respect to the sulphur atom, selected from $C_{1-10}$-alkyl, especially $C_{1-4}$-alkyl, $C_{1-10}$-alkoxy, especially $C_{1-4}$-alkoxy, S-$C_{1-10}$-alkyl, especially S-$C_{1-4}$-alkyl, halogen, phenyl and acyl, such as COOH, $COT^1$, $CONT^1T^2$, $SO_2T^1$ and $SO_2NT^1T^2$ in which $T^1$ and $T^2$ are each independently selected from H, alkyl, especially $C_{1-4}$-alkyl; aryl, especially phenyl and aralkyl, especially benzyl. It is also preferred that the average value of m is from 6 to 10 and more especially from 7 to 9. Where R carries two substituents these may be linked to form a second, fused ring, especially a benzene ring, when R represents a naphthyl group.

It is preferred that $R^1$ is phen-1,2-ylene or naphth-2,3-ylene or phen-1,2-ylene or naphth-2,3-ylene substituted by a group selected from any of the substituents listed above from R. Preferred substituents for $R^1$ are halogen and $C_{1-10}$-alkyl. It is also preferred that the average value of n is from 3 to 5 and more especially 3.5 to 4.5.

It is preferred that $2n+m$ is from 13 to 16, and more preferably 14 or 15. The remaining substitutable positions on the phthalocyanine nucleus are preferably occupied by H, OH, $C_{1-4}$-alkoxy, especially amyloxy and/or halogen atoms.

A preferred form of the compound of the present invention has the formula:

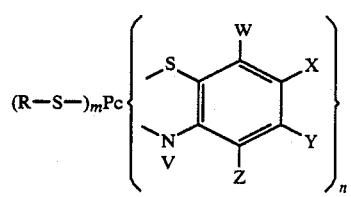

wherein Cu(II)Pc, R, V, m and n are as hereinbefore defined and W, X, Y & Z are each independently selected from H, halogen and $C_{1-10}$-alkyl and more especially $C_{1-4}$-alkyl, or any adjacent pair of W, X, Y & Z represents a fused benzene ring which may be free of substituents or substituted by any of the individual groups represented by W, X, Y and Z.

In an especially preferred compound of Formula II,
R is phenyl, 4-($C_{1-4}$-alkyl)phenyl or 4-($C_{1-4}$-alkoxy)phenyl;
m is 7 or 8; n is 4 V, W, X, Y & Z are H and Pc is Cu(II)Pc.

The compounds of Formulae I and III may be prepared by reaction of a poly(halo)phthalocyanine, preferably one carrying from 13 to 16 halogen atoms, with a mixture of a thiol R—SH, and a thioamine HS—$R^1$—NVH, in the desired molecular proportions, in the presence of an acid binding agent, such as a alkali metal hydroxide, e.g. KOH, at a temperature above 100° C., optionally in an organic medium. It is important to use a mixture of the thiol and aminothiol because introduction of the thiol prior to the aminothiol will lead to significant proportion of a phthalocyanine carrying only substituted-thio groups which is less bathochromic than the intramolecular mixed product of Formula I or II.

Alternatively, the substituted phthalocyanine can be prepared from an appropriately substituted phthalonitrile of the formula:

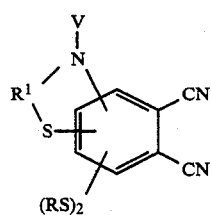

or a mixture thereof with an unsubstituted phthalonitrile or a substituted phthalonitrile in which some of the substitutents are replaced by hydrogen and/or halogen atoms. The phthalonitrile of Formula IV can be prepared by reacting a tetrahalophthalonitrile successively with one equivalent of the aminothiol, HS—R¹—NVH, and two equivalents of the thiol, R—SH, under similar conditions to those employed from preparing the compound of Formula I from a poly(halo)phthalocyanine.

The present compounds have a significant absorption band extending into the near infra-red region of the electromagnetic spectrum, i.e. from 700 to 1500 nm and thus have utility in applications where it is necessary or desirable to absorb infra-red radiation. Suitable applications are in solar and welding screens, in electronics, e.g. in wave guides, video disks, liquid crystal displays, etc. and in a wide range of laser-induced or laser-scanned systems, such as in inks for printing, optical character recognition (OCR) and security systems, e.g. in computer-controlled locks and alarms and for the formation of a security feature in currency, cheques, credit cards, etc.

The compounds of Formulae I and III have good solubility in non-polar organic liquids, especially those used in printing applications, such as ketones, e.g. methylethylketone (MEK), aromatics, e.g. toluene and chlorinated benzenes; aliphatic hydrocarbons, such as white spirit, petroleum fractions and chlorinated aliphatics such as dichloromethane. They are thus suitable for use in printing inks for the preparation of text which is to be read by optical character recognition (OCR) systems in the near infra-red.

The present invention is further illustrated by the following examples in which all parts and percentages are by weight unless otherwise indicated.

EXAMPLE 1

2-Aminothiophenol (58.4 g, 0.42 mol), 4-methylphenylthiol (99.2 g, 0.08 mol), and potassium hydroxide (105.6 g, 1.6 mol), were stirred in DMF (800 ml) at 120°–130° C., for 40 minutes. To the mixture was added, portionwise over 30 minutes, commercial bromotetradecachlorophthalocyanine (VYNAMON Green 2GFW, 113.9 g, 0.10 mol) and the mixture stirred at 125° C. for 2 hours. After cooling to 80° C. ethanol (1600 ml) was added to the stirred reaction mass in order to precipitate the product. The precipitate was filtered off and washed with ethanol and water. The paste was suspended in water, stirred, filtered, and washed with water and ethanol. The wet solid was dried in a vacuum oven at 40° C. and 20 mbar.

| Yield: | 86 g (42% theory) |
| --- | --- |
| $WL_{max}$: | 890 nm (in $CHCl_3$) |
| $EC_{max}$: | 46,000 (in $CHCl_3$) |
| Solubility: | >10% (in MEK) |

$WL_{max}$ is the wavelength of the absorption maxium; and
$EC_{max}$ is the extinction coefficient at the absorption maximum.

The product comprised a mixture of substituted-thio-CuPc with the average formula, hepta-(4-methylphenylthio)-tetra-(1-amino-2-thio-phen-1,2-ylene)-CuPc (HTCPC).

EXAMPLE 2

An 4% ink was prepared by dissolving HTCPC in MEK. The ink was applied to paper by gravure printing and the resulting print displayed very low reflectance (i.e. high absorption) in the range 750–900 nm and gave high print contrast ratios over this range. This demonstrates the suitability of the ink, and thus the compound HTCPC, for use in OCR.

We claim:

1. A phthalocyanine compound of the formula:

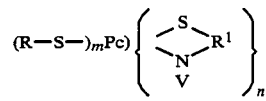

I wherein

Pc is a phthalocyanine nucleus;

each R independently is selected from phenyl, naphthyl and phenyl substituted by from 1 to 3 substituents selected from $C_{1-10}$-alkyl, $C_{1-10}$-alkoxy, S-$C_{1-10}$-alkyl, halogen, phenyl, COOH, $COT^1$, $CONT^1T^2$, $SO_2T^1$ and $SO_2NT^1T^2$ in which $T^1$ and $T^2$ are selected from H, alkyl, aryl and aralkyl;

m is 4 to 12;

V is H or $C_{1-4}$-alkyl;

each $R^1$ independently is selected from phenylene, naphthylene, substituted phenylene and substituted naphthylene in which the substituents are selected from $C_{1-10}$-alkyl, $C_{1-10}$-alkoxy, S-$C_{1-10}$-alkyl, halogen, phenyl, COOH, $COT^1$, $CONT^1T^2$, $SO_2T^1$ and $SO_2NT^1T^2$ in which $T^1$ and $T^2$ are selected from H, alkyl, aryl and aralkyl; and the S atom and the group N-V are attached to adjacent nuclear carbon atoms;

and n is 2 to 6.

2. A compound according to claim 1 wherein Pc is Cu(II)Pc.

3. A compound according to claim 1 wherein R is phenyl, 4-($C_{1-4}$-alkyl)phenyl or 4-($C_{1-4}$-alkoxyphenyl).

4. A compound according to claim 1 wherein m is 6 to 10, n is from 3 to 5 and 2m+n is from 13 to 16.

5. A compound of the formula:

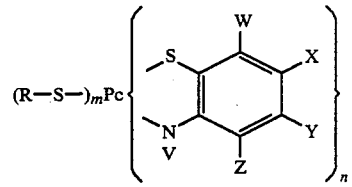

wherein

Pc is a phthalocyanine nucleus;

each R independently is selected from phenyl, naphthyl and phenyl substituted by from 1 to 3 substituents selected from $C_{1-10}$-alkyl, $C_{1-10}$-alkoxy, S-$C_{1-10}$-alkyl, halogen, phenyl, COOH, $COT^1$, $CONT^1T^2$, $SO_2T^1$ and $SO_2NT^1T^2$ in which $T^1$ and $T^2$ are selected from H, alkyl, aryl and aralkyl;

m is 4 to 12;

V is H or $C_{1-4}$-alkyl;

n is 2 to 6; and W, X, Y & Z are each independently selected from

H, halogen and $C_{1-10}$-alkyl; or any adjacent pair of W, X, Y & Z represents a fused benzene ring which is unsubstituted or substituted by halogen or $C_{1-10}$-alkyl.

6. A phthalocyanine compound of the formula:

5
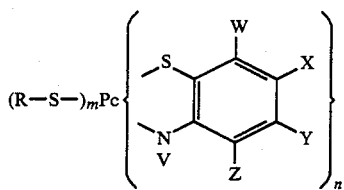
wherein:
R is phenyl, 4-(C$_{1-4}$-alkyl)phenyl or 4-(C$_{1-4}$-alkoxy)-phenyl;
m is 7 or 8; n is 4; V, W, X, Y & Z are H; and Pc is Cu(II)Pc.
* * * * *
6
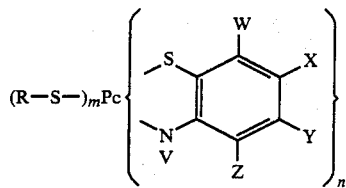
wherein:
R is phenyl, 4-(C$_{1-4}$-alkyl)phenyl or 4-(C$_{1-4}$-alkoxy)-phenyl;
m is 7 or 8; n is 4; V, W, X, Y & Z are H; and Pc is Cu(II)Pc.
* * * * *